United States Patent
Ramaseshadri et al.

(10) Patent No.: US 7,963,605 B2
(45) Date of Patent: Jun. 21, 2011

(54) VEHICLE SEAT LIFT STRUCTURE

(76) Inventors: Ganesh T. Ramaseshadri, Ypsilanti, MI (US); William S. Brewer, Canton, MI (US)

(*) Notice: Subject to any disclaimer, the term of this patent is extended or adjusted under 35 U.S.C. 154(b) by 447 days.

(21) Appl. No.: 11/997,521

(22) PCT Filed: Jul. 31, 2006

(86) PCT No.: PCT/US2006/029837
§ 371 (c)(1), (2), (4) Date: Jun. 18, 2008

(87) PCT Pub. No.: WO2007/016530
PCT Pub. Date: Feb. 8, 2007

(65) Prior Publication Data
US 2008/0303327 A1 Dec. 11, 2008

Related U.S. Application Data

(60) Provisional application No. 60/704,322, filed on Aug. 1, 2005.

(51) Int. Cl.
*A47C 1/00* (2006.01)
*B60N 2/16* (2006.01)
(52) U.S. Cl. ............... 297/344.15; 297/344.12
(58) Field of Classification Search ......... 297/344.15–344.17, 344.12, 344.13, 297/344.14, 216.16, 216.19, 216.2; 248/157, 292.12, 292.14, 419
See application file for complete search history.

(56) References Cited

U.S. PATENT DOCUMENTS

| | | | | |
|---|---|---|---|---|
| 3,167,296 | A * | 1/1965 | Pickles | 248/419 |
| 3,727,974 | A * | 4/1973 | Swenson et al. | 297/300.3 |
| 5,730,411 | A * | 3/1998 | Pawlowicz et al. | 248/421 |
| 6,347,778 | B1 * | 2/2002 | Koga et al. | 248/421 |
| 6,502,799 | B2 | 1/2003 | Lepaule | |
| 6,572,065 | B2 * | 6/2003 | Koga et al. | 248/421 |
| 6,851,753 | B2 * | 2/2005 | Akaike et al. | 297/344.17 |
| 6,902,234 | B2 * | 6/2005 | Becker et al. | 297/216.1 |
| 7,314,249 | B2 * | 1/2008 | Becker et al. | 297/344.15 |
| 2001/0035673 | A1 | 11/2001 | Lepaule | |

FOREIGN PATENT DOCUMENTS
WO  WO 2005042298 A1 * 5/2005

* cited by examiner

*Primary Examiner* — David Dunn
*Assistant Examiner* — Tania Abraham
(74) *Attorney, Agent, or Firm* — Butzel Long

(57) ABSTRACT

A vehicle seat having a lift structure for adjusting the position of the seat employs a load transfer link (9) to transfer the loads applied to the seat from a lift link (3) and an upper support (2) to a pivot bracket (7), which is typically coupled to the floor of the vehicle. The load transfer link is coupled to the pivot bracket on one end and to the lift link on the opposite end, in order to transfer the load. The lift structure permits movement of a restraint seatbelt with the height adjustment of the vehicle seat, thus reducing the potential for discomfort of the occupant.

8 Claims, 2 Drawing Sheets

VEHICLE SEAT LIFT STRUCTURE

BACKGROUND

The present invention relates to the field of vehicle seating technology. More particularly, the invention relates to enhancements in lift structures for motor vehicle seating.

Typically, a lift structure for a vehicle seat includes a floor bracket and an upper support, such as a seat cushion frame, which is height-adjustably connected to the floor bracket or track sections. A torsion tube typically couples a height-adjustable upper support on each side of the vehicle seat so that the sides of the lift structure are parallel when the vehicle seat is subjected to a normal load.

Additionally, a vehicle seat typically has a lap belt restraint as part of a three point harness. The lap belt restraint is typically attached to the floor bracket, which is also referred to as a pivot bracket. The method of attachment to the pivot bracket that is typically employed for a height-adjustable vehicle seat, such as a vehicle seat with a lift structure, may result in discomfort for an occupant of the vehicle seat and may potentially result in miscommunication between sensors of a lift structure.

One noted problem that may occur when a lift structure of a vehicle seat is activated to adjust the seat height is that the seatbelt of the vehicle seat may tighten around the seat occupant. Such a tightening typically results in discomfort for the seat occupant and may require occupant to adjust the seatbelt. A second problem may occur when a lift system of a vehicle seat is activated, wherein the seatbelt may become cinched, since the seatbelt restraint is attached to a floor-mounted pivot bracket. A third problem may result when a sensor, such as an Occupant Classification Sensor (OCS), is located between the occupant and the seatbelt attachment. In this case, the cinched seatbelt may contribute to false inputs being delivered to the OCS. In many vehicle seats, height adjustment of the upper support is typically performed manually or by a motor. Additionally, attaching a lap belt restraint to the upper support of a vehicle seat base is known in the art. However, in addition to the above-stated problems, the attachment of a lap belt restraint to the upper support may create problems with properly restraining and reinforcing the load of the vehicle seat. Becker et al., U.S. Patent Publication No. 2003/0160483, assigned to C. Rob. Hammerstein GmbH & Co., proposes one design to address this issue; however, such a design is itself costly and complicated.

Accordingly, it would be advantageous to provide a lift structure of a vehicle seat, wherein the restraint attachment is affixed to or moves accordingly with an upper support of the vehicle seat base. Such a lift structure would permit movement of the restraint attachment with the height adjustment of the vehicle seat, thus reducing the potential for discomfort for the vehicle seat occupant. The relocation of the restraint attachment to the upper support addresses the aforementioned comfort issue, in addition to avoiding the false inputs being delivered to the OCS system. Additionally, it would be advantageous to provide a lift structure, wherein the seatbelt loads on the upper support of the vehicle seat base bypass the linkages and transfer the seatbelt loads to the pivot bracket through a load transfer link. It should be appreciated that the teachings herein may be applied without necessarily achieving any the advantages identified herein.

SUMMARY

One embodiment of the present invention pertains to a lift structure of a vehicle seat, the lift structure including an upper support, a pivot bracket, a lift link, and a load transfer link. The lift link and the load transfer link each have first and second ends. The first end of the lift link is coupled to the upper support, and the second end of the lift link is coupled to the second end of the load transfer link by a fastener, which allows the second end of the load transfer link to be maneuvered within a slot in the lift link. The first end of the load transfer link is coupled to the pivot bracket in order to transfer the load from the lift link. The slot in the lift link includes a first side and a second side. The fastener coupled with the load transfer link travels along the first side of the slot in the lift link. The second side of the slot in the lift link is defined by a plurality of curved indentations in the surface of the second side, wherein the fastener can be seated when the lift structure is not actuated.

An alternate embodiment of the present invention pertains to a lift system for transferring the load of a vehicle seat including an upper support, a pivot bracket, a lift link, and a load transfer link. The pivot bracket is attachable to a floor of a vehicle. A lift link may be coupled to an upper support to enable movement relative to one another. A load transfer link, having first and second ends, may be coupled within an aperture in the lift link to permit adjustment of the position of the load transfer link. The load transfer link may be further coupled to the pivot bracket. The load transfer link transfers the load of the vehicle seat from the upper support to the pivot bracket, which is attached to the floor of a vehicle.

Another embodiment of the present invention pertains to a method of manufacturing a lift structure for a vehicle seat including the steps of securing a pivot bracket to a floor of a motor vehicle; and coupling a lift link to an upper support to enable movement of the lift link relative to the position of the upper support. The lift link and upper support may be coupled together by a torsion tube, or other coupling devices, which may orthogonally traverse the orientation of the lift link. Additionally, the method includes coupling a second end of a load transfer link, which has a first and second end, within an aperture in the lift link to permit adjustment of the position of the load transfer link, and coupling the first end of the load transfer link to the pivot bracket, wherein the load transfer link is employed to transfer the load of the vehicle seat to the pivot bracket.

DETAILED DESCRIPTION OF THE PREFERRED EMBODIMENTS

Figure 1:
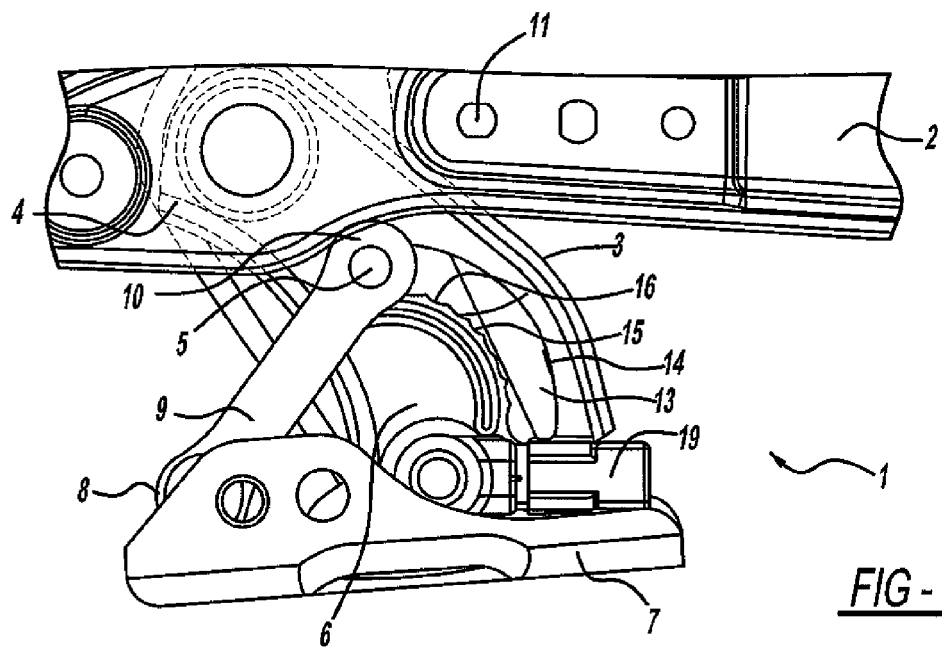
FIG. 1 is a partial side view of a vehicle seat lift structure with the seat heightened.

Referring to FIG. 1, an upper support 2 of a vehicle seat base is illustrated with a plurality of apertures for coupling to support and restraint attachments. Lift link 3 is positioned adjacent to upper support 2. Lift link 3 has a first end 4 and second end 6, wherein first end 4 of lift link 3 is coupled to upper support 2. Lift link 3 and upper support 2 may be coupled in any acceptable manner. In an exemplary embodiment, the coupling may be achieved by a rotatably-adjustable fastener or a torsion tube, of any acceptable type. Lift link 3 also has a slot 13 embodied in lift link 3 for engaging a fastener 5 therein. Slot 13 is a contoured aperture within lift link 3 to facilitate adjustment of load transfer link 9 within lift structure 1 of the vehicle seat. FIG. 1 also illustrates pivot bracket 7 for securing lift structure 1 to a floor of a motor vehicle and for absorbing a load of a vehicle seat. Load transfer link 9 is also shown in FIG. 1 having a first end 8 and a second end 10. First end 8 of load transfer link 9 is coupled to pivot bracket 7, and second end 10 of load transfer link 9 is engaged with slot 13 of lift link 3 by fastener 5. Fastener 5 may be configured to enable second end 10 of the load transfer link 9 to be maneuvered within slot 13 in lift link 3. Fastener 5 is preferably of any acceptable type, such as bolt, screw, rivet or otherwise, for permitting movement and adjustment of load transfer link 9, while maintaining the connection. The adjustment of load transfer link 9 within slot 13 of lift link 3 allows for height adjustment of the vehicle seat.

Slot 13 in lift link 3 engages fastener 5 at second end 10 of load transfer link 9. Slot 13 includes a first side 14 and a second side 15. First side 14 may be referred to as the upper profile of the slot, while second side 15 may be referred to as the lower profile. During actuation of load transfer link 9 within slot 13, fastener 5 is configured to travel along first side 14 of slot 13 in the lift link 3, which is preferably a substantially smooth surface. Second side 15 of slot 13 may include a plurality of curved indentations 16, wherein fastener 5 may be positioned when lift structure 1 is not actuated.

FIG. 1 also illustrates sensor 19 (such as an OCS system), wherein the sensor is preferably provided for detecting the occupancy of a vehicle seat. It should be appreciated that the present design is not limited to any type of OCS and may be modified to accommodate most any type of OCS. FIG. 1 further illustrates the location of restraint attachment 11, wherein restraint attachment 11 may be positioned on upper support 2. Relocation of restraint attachment 11, to being positioned on upper support 2, permits movement of restraint attachment 11 with the height adjustment of the vehicle seat, thus reducing the potential for discomfort for the vehicle seat occupant, while not compromising the load reinforcement due to support provided by load transfer link 9.

Figure 2:
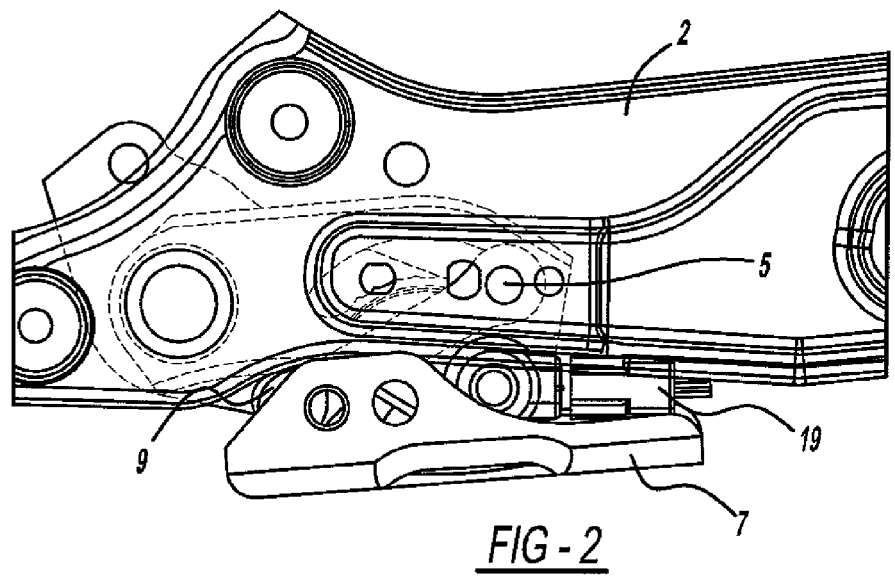
FIG. 2 is a partial side view of the vehicle seat lift structure of FIG. 1 with the seat adjusted to a lower position.

FIG. 2 illustrates lift structure 1 adjusted in a lowered position from that shown in FIG. 1. In FIG. 2, load transfer link 9 and fastener 5 are shown seated in one of the plurality of indentations 16 (see FIG. 1) in slot 13, when the lift structure 1 is not actuated. As load transfer link 9 moves toward second end 6 of lift link 3, the height of lift structure 1 decreases, thus, adjusting the height of the vehicle seat. Load transfer link 9 pivots on its first end with pivot bracket 7, as the height of lift structure 1 is adjusted. Fastener 5 travels along first side 14 of slot 13 until the adjustment of the vehicle seat is complete. Fastener 5 is preferably seated in any of indentations 16, while lift structure 1 is not actuated.

Figure 3:
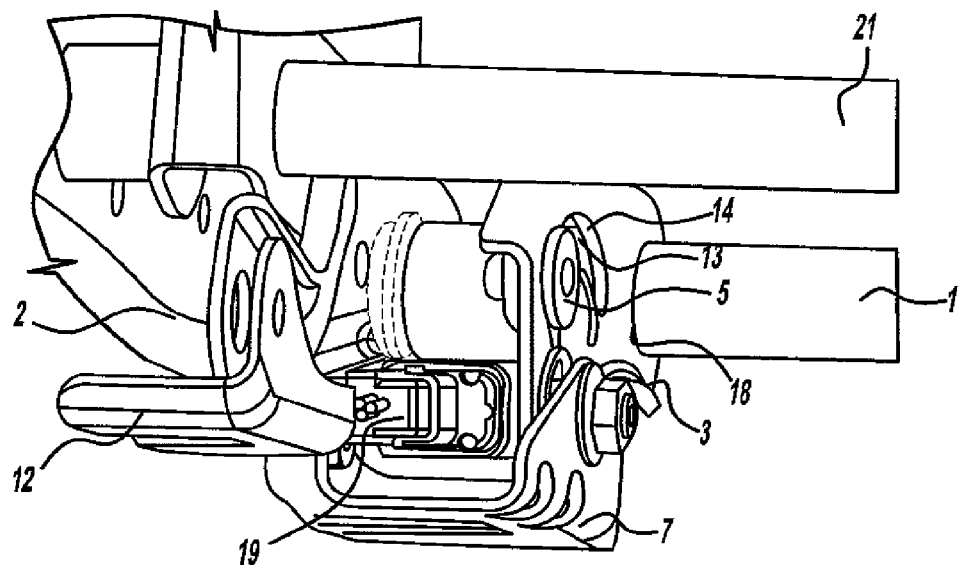
FIG. 3 is a partial front view of the vehicle seat lift structure of FIG. 2.

Referring now to FIG. 3, rear torsion tube 17 and front torsion tube 21 are shown. Rear torsion tube 17 is illustrated traversing through an aperture 18 in lift link 3 and is coupled to upper support 2, which is positioned adjacent to occupant classification sensor 19 for detecting the occupancy of the vehicle seat. Front torsion tube 21 is also illustrated coupled to upper support 2. Fastener 5 is shown coupled to load transfer link 9, in order to permit load transfer link 9 to travel on first side 14 of slot 13. FIG. 3 illustrates lift link 3 coupled internally to pivot bracket 7; however, lift link 3 can be positioned externally to pivot bracket 7 in other embodiments of the present invention. FIG. 3 further illustrates front pivot bracket 12, which is similar to pivot bracket 7, for securing lift structure 1 and absorbing the load of a vehicle seat.

Figure 4:
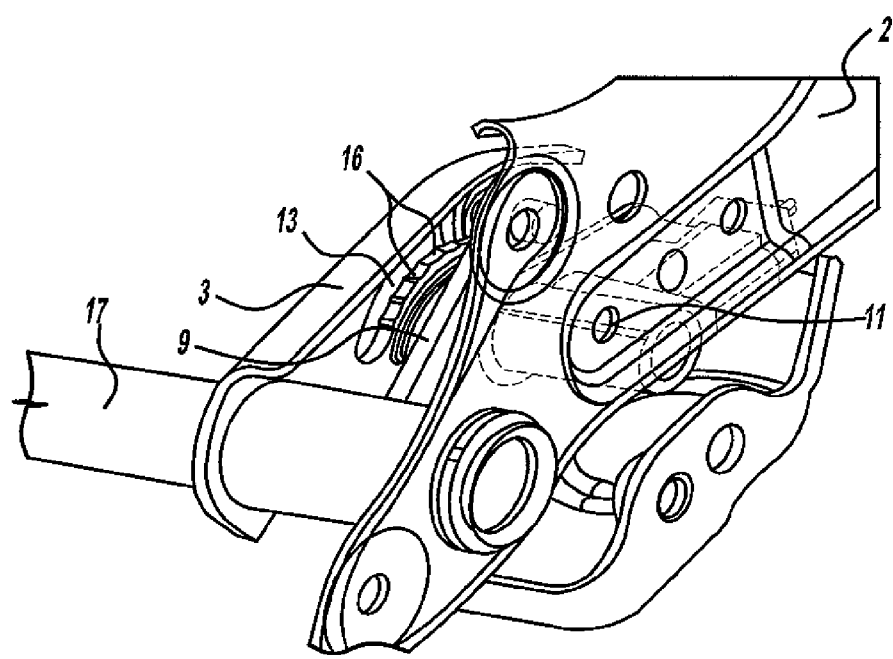
FIG. 4 is a partial rear view of the vehicle seat lift structure of FIG. 2.

FIG. 4 is a rear-view perspective of a vehicle seat lift structure. FIG. 4 illustrates torsion tube 17 traversing through aperture 18 and first end 4 of lift link 3 and is coupled to upper support 2. Load transfer link 9 is shown seated in one of the plurality of curved indentations 16 in slot 13. FIG. 4 also illustrates the location of restraint attachment 11 being positioned on upper support 2.

Throughout the specification numerous advantages of exemplary embodiments have been identified. Although many features have been described in the context of a vehicle seat comprising a particular lift structure, it will be appreciated such features could also be implemented in the context of other configurations. Further, although the disclosed methods are described as a series of steps performed sequentially, it is to be understood that the steps generally may be performed in any order unless otherwise noted or obvious to a person of ordinary skill. Additionally, some steps may be performed repetitively in particular one of the steps being performed more frequently than others when applicable. Alternatively, it may be desirable in some situations to perform steps in a different order than described. Accordingly, it should be understood that changes and modifications may be made to the present invention without departing from the spirit thereof which should only be delimited by any claim appended hereto.

We claim:

1. A lift apparatus for a vehicle having a seat, comprising:
   a pivot bracket attached to a floor of the vehicle;
   a load transfer link having a first and a second end, the first end of the load transfer link being coupled to the pivot bracket for transferring the load of the vehicle seat;
   a lift link having a first and a second end and a slot, the first end of the lift link is coupled to an upper support of a seat base and the second end of the lift link is coupled to the pivot bracket, and the second end of the load transfer link moves within the lift link slot during height adjustment of the vehicle seat, wherein the lower edge of the lift link slot includes a plurality of indentations;
   a seat belt restraint attachment coupled to the upper support, such that the seat belt restraint attachment moves with the upper support as the height of the seat is adjusted; and
   a fastener coupled to the load transfer link that moves within the lift link slot as the height of the seat is adjusted and wherein the fastener is supported in one of the plurality of indentations when the lift apparatus is not actuated.

2. The lift apparatus of claim 1, further including a torsion tube coupled to the upper support of the vehicle seat.

3. The lift apparatus of claim 1, further including a sensor for detecting a load in the vehicle seat.

4. The lift apparatus of claim 1, wherein the lift link slot includes an upper edge that is smooth such that the fastener travels along the upper edge of the slot during height adjustment of the vehicle seat.

5. A lift system for adjusting a height of a seat within a vehicle, comprising:
   a pivot bracket mounted to a floor of the vehicle;
   an upper support secured to a vehicle seat base that is spaced a predetermined distance from the pivot bracket, and the upper support sustains a load of the seat;
   a load transfer link having a lower end that is pivotally coupled to the pivot bracket, wherein the load transfer link transfers the load of the vehicle seat to the pivot bracket;
   a lift link having a first and a second end and a slot, the first end of the lift link being coupled to an upper support of the seat base and the second end of the lift link being coupled to the pivot bracket, and the second end of the load transfer link moves within the lift link slot during height adjustment of the vehicle seat, wherein the lower edge of the lift link slot includes a plurality of indentations;

a seat belt restraint attachment coupled to the upper support, such that the seat belt restraint attachment moves with the upper support as the height of the seat is adjusted; and a fastener coupled to the load transfer link that moves within the lift link slot as the height of the seat is adjusted and wherein the fastener is supported in one of the plurality of indentations when the lift system is not actuated.

6. The lift apparatus of claim 5, further including a torsion tube coupled to the upper support of the vehicle seat.

7. The lift apparatus of claim 5, further including a sensor for detecting a load in the vehicle seat.

8. The lift apparatus of claim 5, wherein the lift link slot includes an upper edge that is smooth such that the fastener travels along the upper edge of the slot during height adjustment of the vehicle seat.

* * * * *